(12) United States Patent
Hayakawa

(10) Patent No.: US 6,721,540 B1
(45) Date of Patent: Apr. 13, 2004

(54) ELECTRONIC DEVICE

(75) Inventor: Motomu Hayakawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/700,854

(22) PCT Filed: Mar. 21, 2000

(86) PCT No.: PCT/JP00/01707

§ 371 (c)(1),
(2), (4) Date: Nov. 17, 2000

(87) PCT Pub. No.: WO00/57531

PCT Pub. Date: Sep. 28, 2000

(30) Foreign Application Priority Data

Mar. 19, 1999 (JP) .............................................. 11-076644

(51) Int. Cl.[7] .................................................. H04B 5/00
(52) U.S. Cl. ........................ 455/41.1; 455/573; 455/558
(58) Field of Search ............................... 455/41.1, 572, 455/573, 558; 340/870.31; 375/258

(56) References Cited

U.S. PATENT DOCUMENTS

| | | | |
|---|---|---|---|
| 4,608,550 A | | 8/1986 | Umebayashi et al. |
| 5,128,972 A | | 7/1992 | Horinouchi et al. |
| 5,293,400 A | * | 3/1994 | Monod et al. ............... 375/219 |
| 5,345,231 A | * | 9/1994 | Koo et al. ............... 340/870.31 |
| 5,473,145 A | | 12/1995 | Wallerstorfer et al. |
| 5,473,323 A | * | 12/1995 | Kreft ....................... 340/10.34 |
| 5,515,399 A | | 5/1996 | Swart |
| 5,917,429 A | * | 6/1999 | Otis et al. ............... 340/870.31 |
| 6,091,779 A | * | 7/2000 | Griessbach ................. 375/258 |
| 6,459,882 B1 | * | 10/2002 | Palermo et al. ............ 455/41.1 |
| 6,498,923 B2 | * | 12/2002 | Ikefuji et al. .............. 455/41.1 |

FOREIGN PATENT DOCUMENTS

| | | |
|---|---|---|
| EP | 0 298 707 | 1/1989 |
| EP | 0 743 532 A2 | 11/1996 |
| EP | 0 743 534 A2 | 11/1996 |
| EP | 0 849 121 A1 | 6/1998 |
| JP | 2-10189 | 1/1990 |
| JP | 3-112326 | 5/1991 |
| JP | 11-332135 | 11/1999 |

* cited by examiner

*Primary Examiner*—Vivian Chin
*Assistant Examiner*—Tuan A Tran

(57) ABSTRACT

An electronic device in which electrical power transfer and data transfer are performed by exchanging physical energy between a station and an electronic watch. In the station, a packet creating circuit creates either a charging packet or a data packet. The station transmits the created packet to the electronic watch using electromagnetic coupling. In the electronic watch, a packet determining circuit determines the format of the transmitted packet. The charging operation of a secondary battery and the writing operation of the transferred data to a memory are switched in accordance with the determination result of the packet determination circuit.

15 Claims, 7 Drawing Sheets

[FIG. 1]
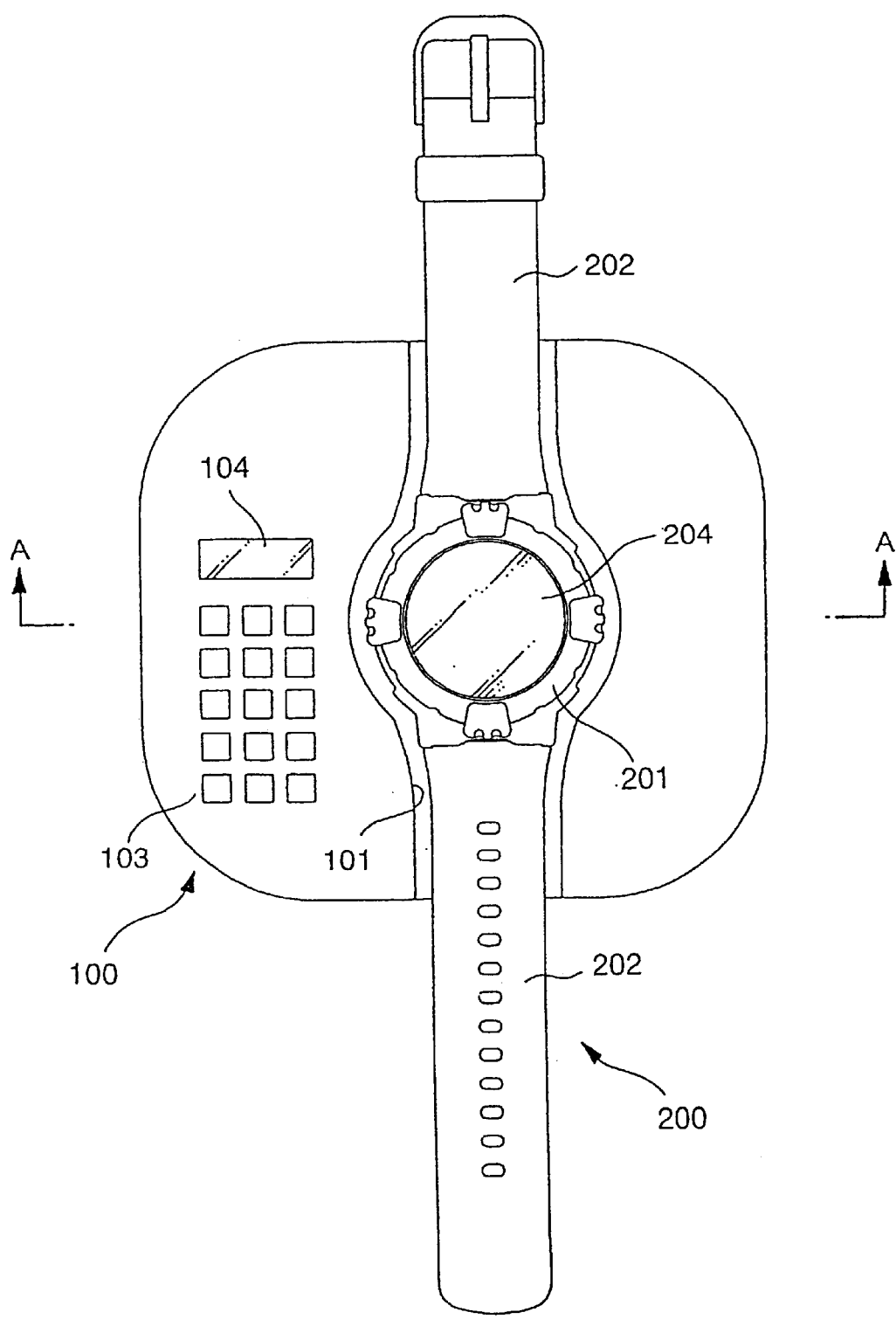

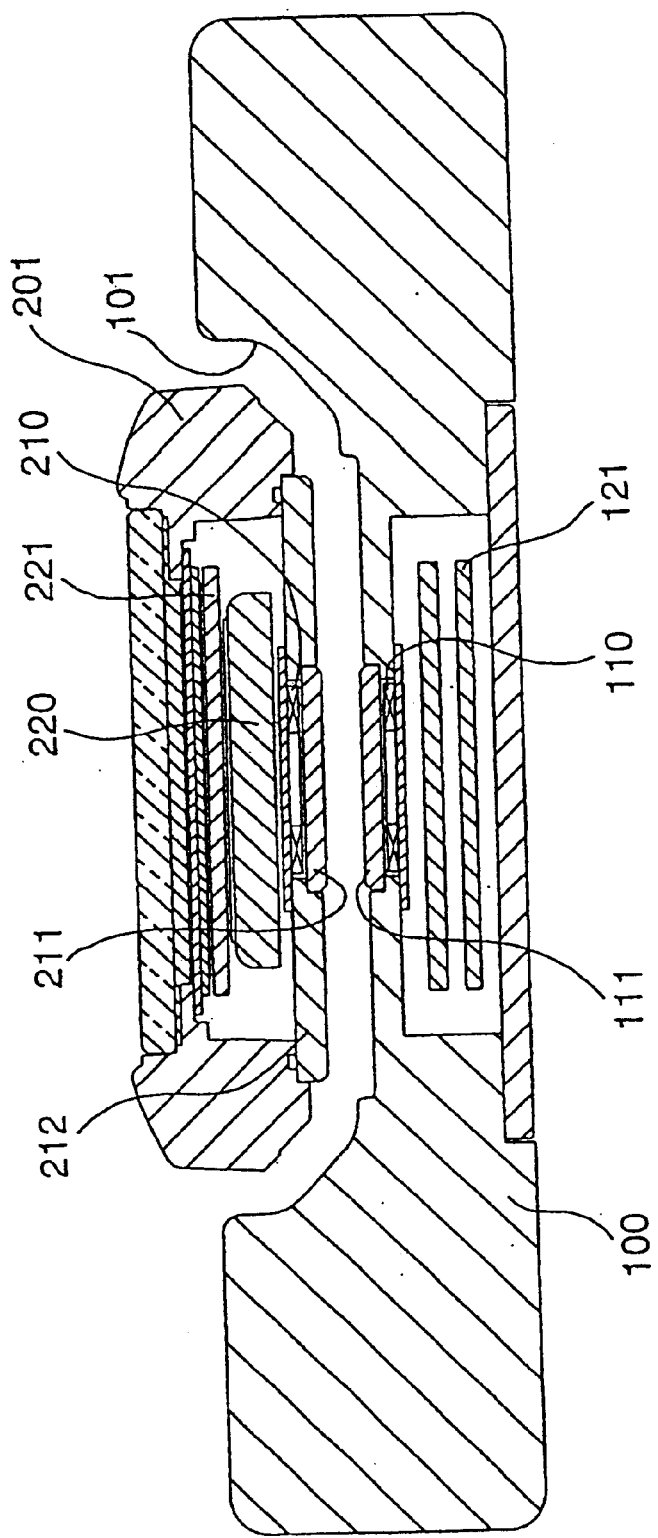
[FIG. 2]

[FIG. 3]
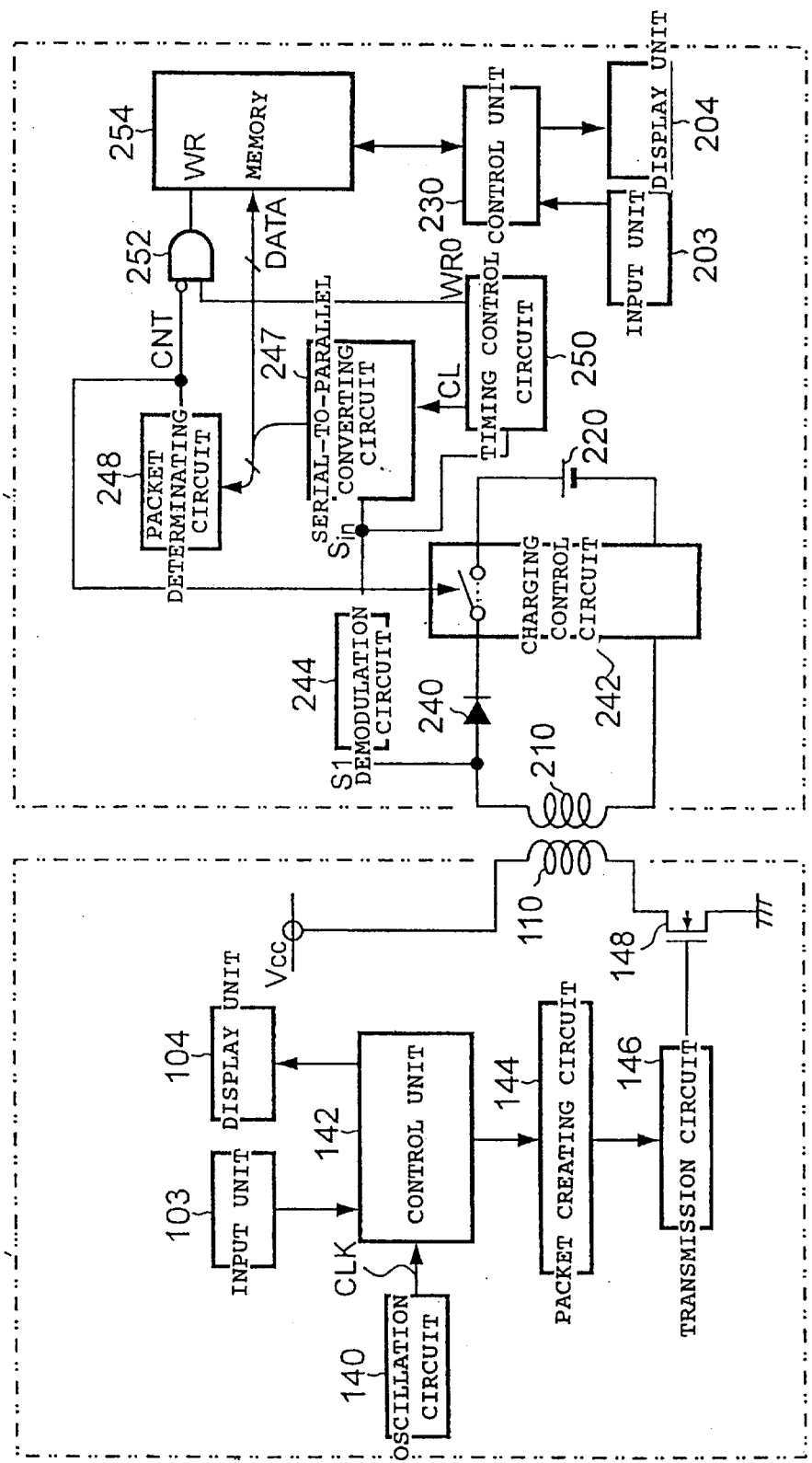

[FIG. 4]
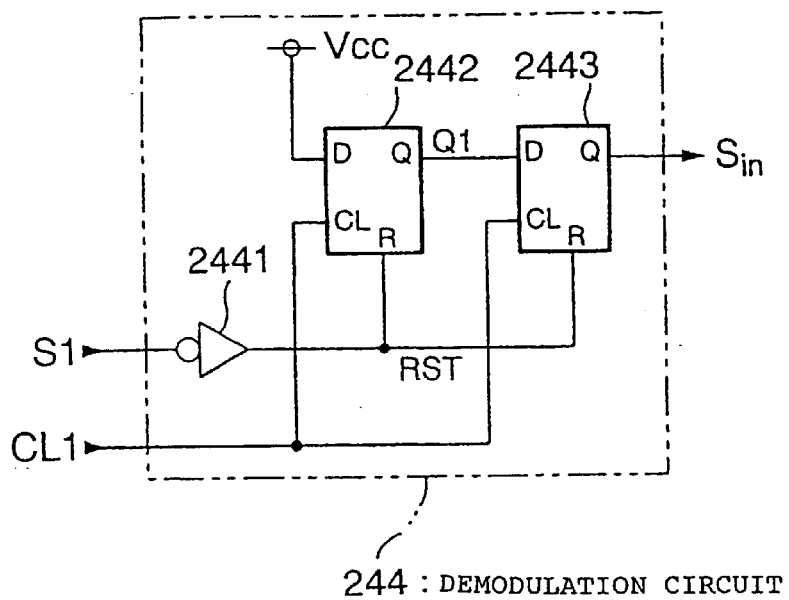
244 : DEMODULATION CIRCUIT
[FIG. 5]
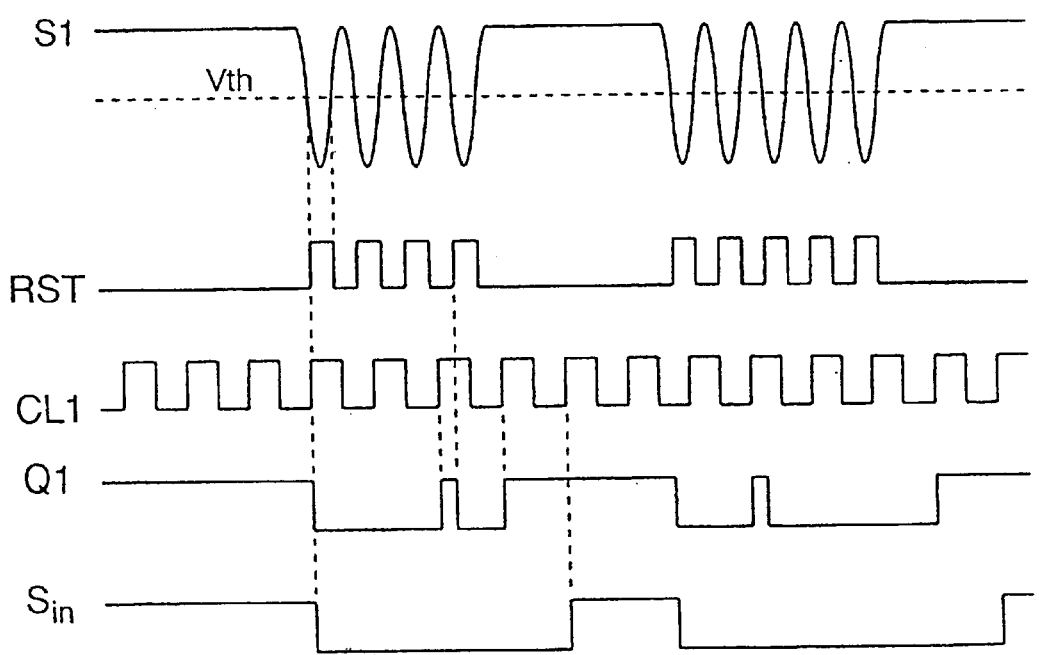

[FIG. 6]
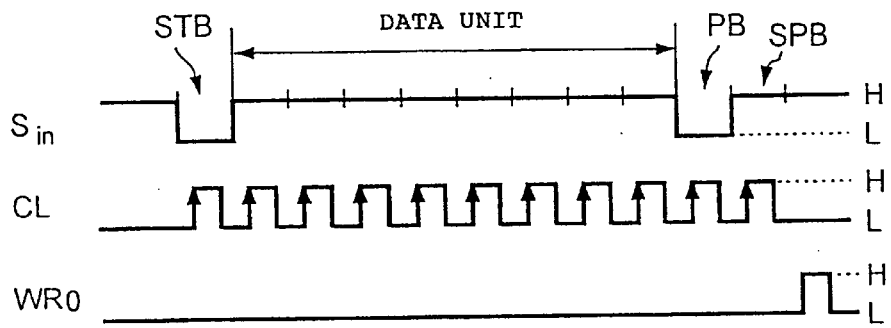
[FIG. 7]
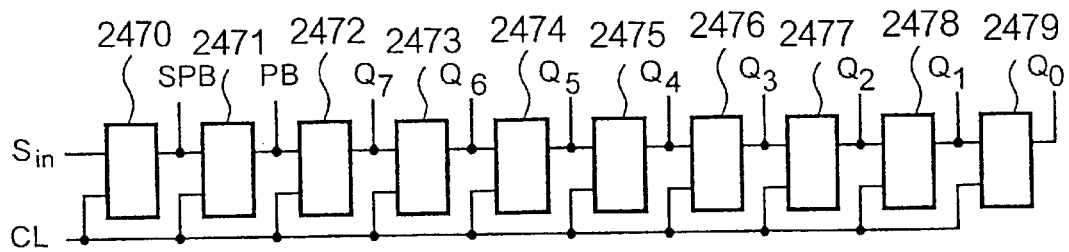
[FIG. 8]
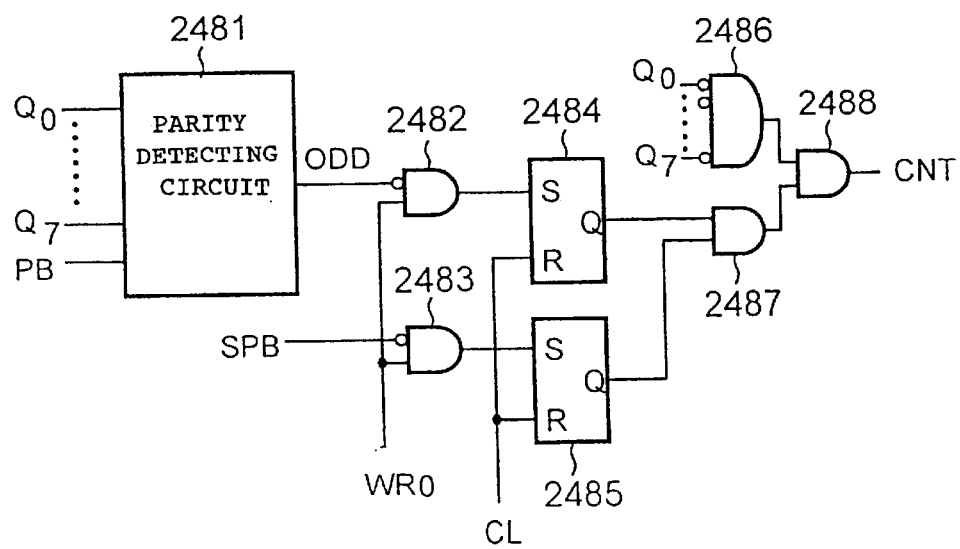

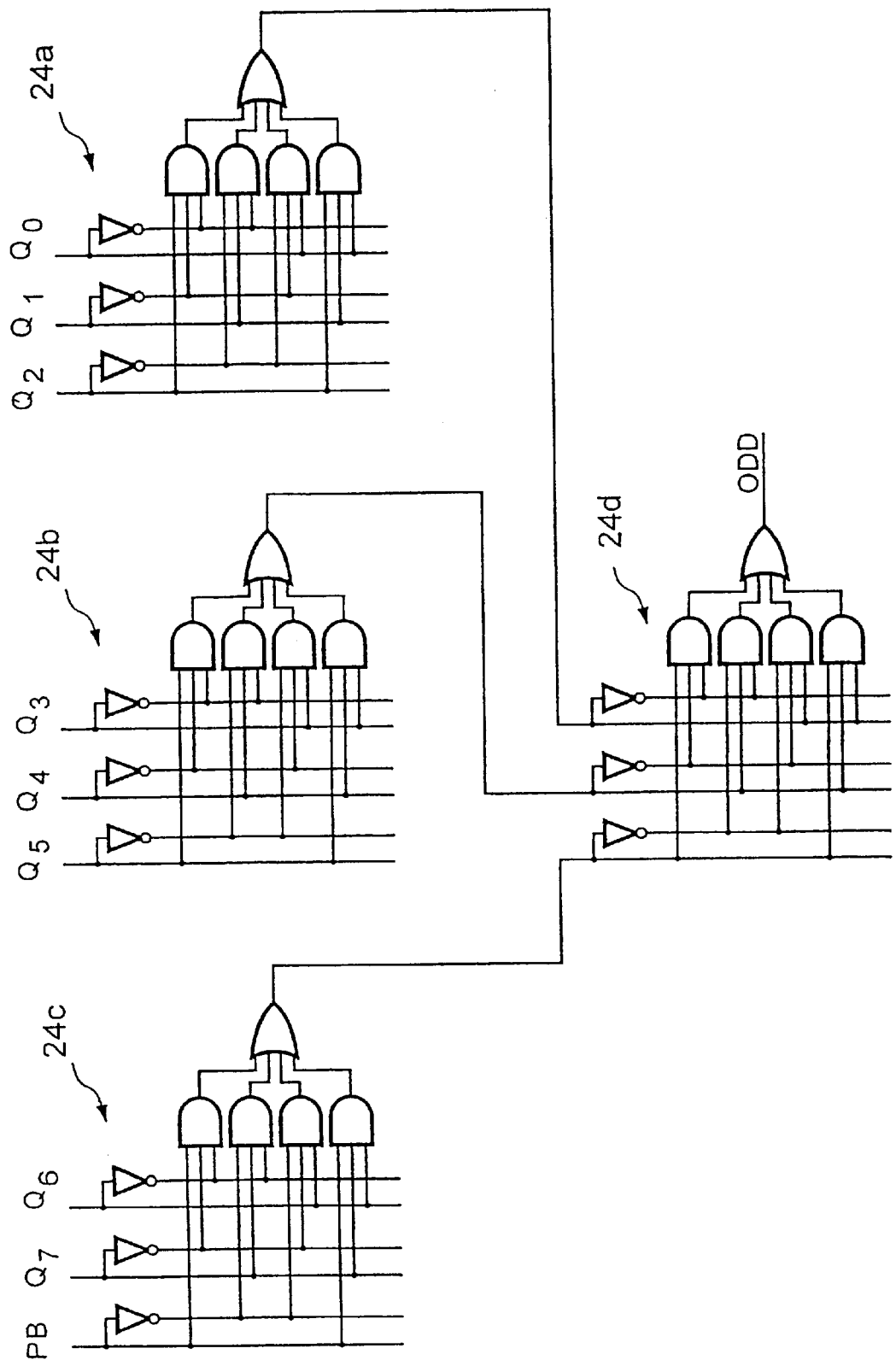
[FIG.9]

[FIG. 10]
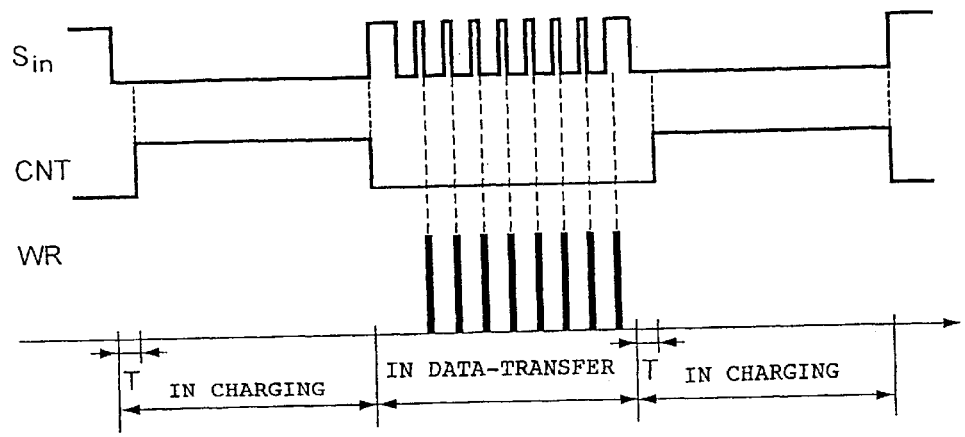
[FIG. 11]
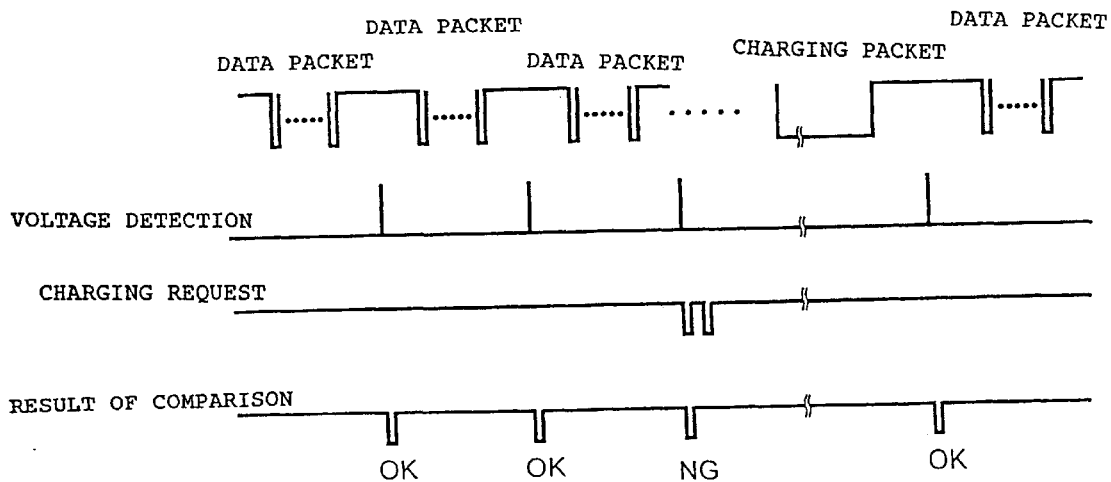

ELECTRONIC DEVICE

TECHNICAL FIELD

The present invention relates to an electronic device in which electrical power transfer and signal transfer are realized by exchanging physical energy among devices.

BACKGROUND ART

Recently devices have been proposed in which, when a portable electronic device such as a portable terminal or an electronic timepiece is contained in a battery charger called a "station", data transfer is performed between the portable electronic device and the station along with charging of the portable electronic device. When the charging or the data transfer is arranged to be performed via electrical contacts, since these electrical contacts are exposed, a problem arises with respect to waterproofing. Because of this, it is desired that the charging or the signal transfer be arranged to be performed in a noncontact manner by means of electromagnetic coupling caused by inductors provided in the station and the portable electronic device.

In such an arrangement, when a high frequency signal is applied to the inductor of the station, an external magnetic field occurs and then an induced voltage is generated across the inductor on the part of the portable electronic device. By rectifying this induced voltage using a diode or the like, a secondary battery incorporated in the portable electronic device can be charged in a noncontact manner. Due to electromagnetic coupling between both inductors, the data transfer can be performed in a noncontact manner from the station to the portable electronic device and/or from the portable electronic device to the station.

The charging of the secondary battery incorporated in the portable electronic device and the data transfer between the station and the portable electronic device is performed using the same principle, that is, these are performed by applying a high frequency signal to the inductor. Therefore, when a user performs the charging during the data transfer between the station and the portable electronic device, since the portable electronic device determines that abnormal data is transmitted, there is a risk that the portable electronic device may malfunction, which is against the intentions of the user. Likewise, since the charging and the data transfer are performed using the same principle, data communication cannot be performed during the charging.

Therefore, a conventional electronic device distinguishes a charging mode from a communication mode. By exclusively enabling one of the charging and the data communication to be performed within a predetermined period, the conventional electronic device is controlled so as to prevent malfunctioning. In this case in which the charging mode and the communication mode are exclusively switched, when the data communication requires a long time and when the voltage of the secondary battery of the portable electronic device drops, since transition must be made from the communication mode to the charging mode after the termination of a sequence of the communication, the secondary battery cannot be charged instantly. Accordingly, there is a problem that the secondary battery voltage drop causes communication quality to be degraded. There is a proposition in which the charging of the secondary battery is performed by rectifying the communication data during the communication mode. However, this proposition is a problem that the secondary battery is overcharged when the communication takes a long time.

SUMMARY OF THE INVENTION

The present invention provides an electronic device in which, without causing malfunction, improvement of usability can be achieved by enabling charging and data communication to be performed among discrete devices when the user desires.

According to a first aspect of the present invention, in an electronic device in which electrical power transfer and data transfer are performed by exchanging physical energy with an opposing device, the electronic device includes a packet creating unit for creating a packet having a format corresponding to the electrical transfer or the data transfer and a superposing unit for superposing the created packet created by the packet creating unit onto the physical energy.

According to a second aspect of the present invention, in an electronic device in which electrical power transfer and data transfer are performed by exchanging physical energy with an opposing device, the electronic device includes an extracting unit for extracting a packet superposed on the physical energy generated from the opposing device, a packet determining unit for determining a packet format extracted by the extracting unit, and a control unit performing either electrical power reception or data reception based on the determination result by the packet determining unit.

According to a third aspect of the present invention, in an electronic device in which a first device and a second device are provided, and electrical power transfer and data transfer are performed by exchanging physical energy between the first device and the second device, the first device is provided with a packet creating unit for creating a packet having a format corresponding to electrical power transfer or data transfer and a superposing unit for superposing the packet created by the packet creating unit onto the physical energy, and the second device is provided with an extracting unit for extracting the packet superposed on the physical energy, a packet determining unit for determining a packet format extracted by the extracting unit, and a control unit for performing either electrical power reception or data reception based on the determination result by the packet determining unit.

According to the first aspect (the third aspect), by providing an instructing unit for selectively instructing either the electrical power transfer or the data transfer with the electronic device (the first device), the packet creating unit may create the packet having the format corresponding to the transfer instructed by the instructing unit. In addition, in a case in which an electrical power transfer request is transmitted from the opposing device, the instructing unit may give an electrical power transfer instruction.

According to the first aspect (the third aspect), the packet creating unit may create a data transfer format packet by storing an appropriate error detection code in a region for storing an error detection code provided in the packet when the data transfer format packet is created, and may create an electrical power transfer format packet by storing an inappropriate error detection code therein when the electrical power transfer format data is created.

According to the second aspect (the third aspect), alternatively, a converting unit for converting the physical energy generated from the opposing device into electrical energy and a secondary battery are further provided in the electronic device (second device), and in a case in which the packet format determined by the packet determining unit is an electrical power transfer format, a charging control unit for charging the secondary battery using the electrical energy is provided in the control unit. In addition, the electronic device (the second device) may be provided with a voltage detecting unit for detecting the voltage of the secondary battery when the packet is received, and a charging-request transmission unit for, in a case in which the voltage of the secondary battery is a predetermined value or less, transmitting a request for charging to the first device to the opposing device (the first device).

According to the second aspect (the third aspect), the electronic device (the second device) may be provided with a storing unit for storing data therein, and a storage control unit for, in a case in which the packet format determined by the packet determining unit is a data transfer format, allowing the received data to be stored in the storing unit.

According to the second aspect (the third aspect), the packet determining unit may error-detect the packet extracted by the extracting unit and may determine the packet format based on the result of the error detection.

BRIEF DESCRIPTION OF THE DRAWINGS

FIG. 1 is a plan view showing the construction of a station 100 and an electronic watch 200 according to an embodiment of the present invention.

FIG. 2 is a cross sectional view showing the construction of the station 100 and the electronic watch 200.

FIG. 3 is a block diagram showing the electrical construction of the station 100 and the electronic watch 200.

FIG. 4 is a block diagram showing the construction of a demodulation circuit 244 of the electronic watch 200.

FIG. 5 consists of timing charts illustrating actions of the demodulation circuit 244.

FIG. 6 is a timing chart showing one example of a demodulation signal $S_{in}$, a clock signal CL, and a writing control signal WR0, which are used in the electronic watch 200.

FIG. 7 is a block diagram showing the internal construction of a serial-to-parallel converting circuit 247 of the electronic watch 200.

FIG. 8 is a block diagram showing the internal construction of a packet determining circuit 248 of the electronic watch 200.

FIG. 9 is a block diagram showing the internal construction of a parity detecting circuit 2481 of the packet determining circuit 248.

FIG. 10 is a timing chart illustrating the operations of the station 100 and the electronic device 200.

FIG. 11 is a diagram illustrating a modified form of the embodiment of the present invention.

BEST MODE FOR CARRYING OUT THE INVENTION

Hereinafter, while referring to drawings, an electronic device according to best mode for carrying out the invention is described with reference to the drawings. Parts identical to corresponding parts in each of the drawings have the same reference numerals. In the present embodiment, although the description is made using an example in which a station serves as an electronic device and an electronic watch serves as an opposing device, the present invention is not necessarily limited to the concrete construction of the present embodiment of the present invention.

FIG. 1 is a plan view showing the construction of a station (a first device) 100 and an electronic watch 200 according to the embodiment. As shown in this figure, the electronic watch 200 is contained in a recessed part 101 of a station 100 when the charging or the data transfer is performed. Since this recessed part 101 is formed having a shape so as to correspond to a main part 201 and a band 202 of the electric watch 200 and so as to be slightly larger than these, the watch main part 201 is contained in the station 100 while being located.

The station 100 is provided with an input section 103 for performing an input operation for the start of charging and the start of data transfer as well as a display section 104 for showing various displays. The electronic watch 200 according to the present embodiment is constructed so as to be worn on a wrist of a user in a normal operating condition and is capable of displaying the date, the time, and the like on the display section 104.

FIG. 2 shows a cross sectional view taken along line A—A in FIG. 1. As shown in this figure, a watch-side inductor 210 for transferring data and charging is provided via a cover glass 211 in a bottom back cover 212 of the electronic watch main part 201. A circuit substrate 221, which is connected to a secondary battery 220, the watch-side inductor 210, and the like, is provided in the watch main part 201.

An inductor 110 is provided via a cover glass 111 in the recessed part 101 of the station 100 so as to face the watch-side inductor 210. Furthermore, the station 100 is provided with a circuit substrate 121 which is connected to the inductor 110, the input section 103, the display section 104, the primary battery (not shown), and the like.

Thus, in a state in which the electronic watch 200 is contained in the station 100, the station-side inductor 110 and the watch-side inductor 210 are not in physical contact because of the cover glasses 111 and 211. However, since the winding faces of the inductors are parallel, they are electromagnetically coupled.

To avoid magnetization of the watch mechanical part, to avoid an increase in weight of the watch-side, to avoid exposure of magnetic metals, and the like, the station-side inductor 110 and the watch-side inductor 210 are air-core inductors having no core. Therefore, the adoption of an inductor having a core may be applied to an electronic device in which these reasons do not matter. However, when the frequency of a signal applied to the inductor is sufficiently high, an air-core inductor suffices.

Next, the electrical construction of the station 100 and the electrical watch 200 are described.

FIG. 3 is a circuit diagram showing the electrical construction of the station 100 and the electronic watch 200. In this figure, an oscillation circuit 140 outputs a clock signal CLK for synchronizing the actions of each unit. The input unit 103 is operated by the user and outputs an input signal in response to the user's operation (instruction). A control unit 142 operates in synchronization with the clock signal CLK output from the oscillation circuit 140 and each unit of the station unit 100 is controlled based on the input signal from the input unit 103. The display section 104 displays various information to the user based on a control signal output from the control unit 142. The input unit 103 and the control unit 103 constitute an instruction unit.

A packet creating circuit (packet creating unit) 144 creates a packet formatted in a predetermined manner based on a control signal output from the control unit 142 and output a signal representing the created packet. The format of the packet is described in detail below. A transmission circuit 146 outputs a switching signal obtained by causing a fixed frequency signal to be output in bursts while the signal output from the packet creating circuit 144 is retained at an L level. The output terminal of the transmission circuit 146 is connected to the gate of a transistor 148.

The drain of the transistor 148 is connected to one end of the inductor 110, and the source thereof is grounded. The other end of the inductor 110 is pulled up by the power supply voltage Vcc. Accordingly, the transistor 148 is switched in accordance with the output level of the switching signal output from the transmission circuit 146. That is, the transmission circuit 146, the transistor 148, and the inductor 110 constitute a superposing unit in which the signal output from the packet creating circuit 144 is superposed onto electromagnetic energy.

Next, the electronic watch 200 side is described. While one terminal of the watch-side inductor 210 is connected via a diode 240 and a charging control circuit 242 to the positive-side terminal of the secondary battery 220, the other terminal of the watch-side inductor 210 is connected via the charging control circuit 242 to the negative-side terminal of the secondary battery 220. The charging control circuit 242 causes the cathode of the diode 240 and the positive-side terminal of the secondary battery 220 to be connected when a control signal CNT output from a packet determining circuit 248, which is described below, is an H level (HIGH level); when the signal level is the L level (LOW level), they are caused to be insulated.

The input of a demodulation circuit (extracting unit) 244 is connected to a connection point between the anode of the diode 240 and the watch-side inductor 210. The demodulation circuit 244 demodulates and wave-rectifies the signal transmitted from the station-side inductor 110 to the watch-side inductor 210, whereby a demodulated signal $S_{in}$ is output from the output terminal thereof. This demodulated signal $S_{in}$ is serial data having a signal format used for serial data transfer.

Here, the construction of the demodulation circuit 244 of the electronic watch 200 is described with reference to FIG. 4. FIG. 4 is a block diagram showing the construction of the demodulation circuit 244 of the electronic watch 200. The construction shown in the figure is merely one example and is inherently varied in accordance with the modulation method of the transmission circuit 146 of the station 100.

As shown in FIG. 4, a signal S1 induced across the terminals of the watch-side inductor 210 is level-inverted as well as wave-rectified by an inverter circuit 2441 and is supplied as reset signals RST to D flip-flops 2442 and 2443. A clock signal CL1 in synchronization with a clock signal CL, which is described below, is input to clock terminals CL of D flip-flops 2442 and 2443. An input terminal D of the D flip-flop 2442 is connected to the power supply voltage Vcc and an output terminal Q thereof is connected to the input terminal D of the next-stage D flip-flop 2443. The demodulation signal is arranged so that the signal from the output terminal Q of the D flip-flop 2443 is output as the demodulated signal $S_{in}$.

Next, the waveform of each unit of the demodulation circuit 244 having the above-described construction is described. FIG. 5 is a timing chart illustrating actions of the demodulation circuit 244.

By causing the transmission circuit 146 to switch the transistor 148 on, the signal S1, shown in FIG. 5, is assumed to be induced across the watch-side inductor 210.

For such a signal S1, as shown in FIG. 5, when the level of the signal S1 is below a threshold value Vth, the signal RST, i.e., the output signal from the inverter circuit 2441, goes to a square wave having the H level. The D flip-flops 2442 and 2443 are reset in a case in which the signal RST is the H level. Since, at the leading edge of the clock signal CL1, the D flip-flops 2442 and 2443 output the signals having the level of the corresponding input terminals D immediately before, the outputs $Q_1$ of the D flip-flop 2442 and $S_{in}$ of the D flip-flop 2443 are each as shown in FIGS. 5. That is, the level of the output signal $S_{in}$ output from the demodulation circuit 244 goes to the L level during the period of the occurrence of the external magnetic field caused by the inductor 110 of the station 100.

The period of the occurrence of the external magnetic field due to the inductor 110 of the station 100 is a period during which bits constituting a packet input to the transmission circuit 146 are at the L level.

In FIG. 3, the serial-to-parallel converting circuit 247 is a circuit which converts the demodulation signal $S_{in}$, which is the serial signal, into a parallel signal having a signal format used for parallel data transfer, and which is provided at the subsequent stage of the demodulation circuit 244. A timing control circuit 250 creates the clock signal CL for controlling operating timing of the serial-to-parallel converting circuit 247 and creates a writing control signal WR0 for controlling timing of writing the received communication data based on input demodulation signal $S_{in}$ to a memory 254.

The writing control signal WR0 is a signal that controls whether or not the parallel data output from the serial-to-parallel converting circuit 247 is to be written to the memory 254, and primarily prevents data other than appropriate communication data from being written to the memory 254 during conversion of the serial-to-parallel converting circuit 247.

Here, the packet exchanging between the station 100 and the electronic watch 200 is described. When the communication is normally performed, the packet created in the packet creating circuit 144 and the packet represented by the demodulation signal $S_{in}$ output from the demodulation circuit 244 are identical.

FIG. 6 is a timing chart showing one example of the demodulation signal $S_{in}$, the clock signal CL, and the writing control signal WR0. As shown in FIG. 6, the packet represented by the demodulation signal $S_{in}$ includes a start bit STB, an 8-bit data unit, a parity bit PB, and a stop bit SPB. The start bit is a bit for identifying the start of the packet. The data unit is a bit group whose level (value) of each bit is varied in accordance with the communication data. The parity bit PB is a bit for error detection due to the parity check and uses odd parity in the present embodiment. That is, in a case in which the number of bits having the H level in the data unit is an odd number, the H level is set to the level of the parity bit PB; and when it is an even number, the L level is set to the parity bit PB, whereby the number of bits in the data unit and the parity bit PB is arranged to be an odd number. The stop bit SPB is a bit for identifying the end of the packet.

In the present embodiment, the packet creating circuit 144 creates a packet having all bits containing the start bit STB, the 8-bit data unit, the parity bit PB, and the L level is set to the stop bit SPB when the secondary battery 220 is to be charged (hereinafter the packet transmitted from the station 100 during the charging is referred to as a "charging packet"). That is, in the charging packet, the parity bit PB does not function as the odd parity bit.

In the case of the normal data communication, a packet transmitted from the station 100 (referred to as a "data packet") has a start bit STB of the L level and a stop bit SPB of the H level. The 8 bits of the data unit are in accordance with the communication data and the value of the parity bit PB is in accordance with the content of the data unit.

Next, the internal construction of the serial-to-parallel converting circuit 247 is described.

FIG. 7 is a block diagram showing the internal construction of the serial-to-parallel converting circuit 247. As shown in FIG. 7, the serial-to-parallel converting circuit 247 is a ten-stage shift register obtained by cascading flip-flops 2470 to 2479. The clock signal CL is input to each of the flip-flops 2470 to 2479. Whenever the clock signal CL is input, the stored content from each stage is shifted to its subsequent stage. In the example shown in FIG. 7, when the clock signal CL having an amount corresponding to ten cycles are input to the serial-to-parallel converting circuit 247, the binary signal $Q_1$ to $Q_7$ representing each bit signal of the data unit of the packet, a binary signal PB representing the parity bit PB, and the binary signal SPB representing the stop bit SPB shown in FIG. 6 are obtained. In this embodiment, the binary signal corresponding to a bit has the same reference numeral as the corresponding bit has.

Next, the packet determining circuit 248 is described. Based on the parallel signals (signals $Q_1$ to $Q_7$ and PB) output from the serial-to-parallel converting circuit 247, the clock signal CL output from the timing control circuit 250, and the writing control signal WR0, the packet determining circuit 248 is a circuit that determines whether a packet transmitted from the station 100 is a charging packet or a data packet.

In a case in which all of the following conditions (1) to (3) are satisfied, the packet determining circuit 248 determines that the transmitted packet is the charging packet.

(1) a parity error occurs
(2) the stop bit SPB is the L level
(3) all of the signals of the data unit $Q_1$ to $Q_7$ are the L level.

FIG. 8 is a block diagram showing the internal construction of the packet determining circuit 248.

In this figure, the parity detecting circuit 2481 outputs a parity detection signal ODD having the H level in a case in which the number of H level signals in the signals (the signals $Q_1$ to $Q_7$ and PB) constituting the parallel a signal input to the packet determining circuit 248 is odd.

FIG. 9 is a block diagram showing the internal construction of the parity detecting circuit 2481. As shown in FIG. 9, the parity detecting circuit 2481 includes parity detecting units 24a, 24b, 24c, and 24d, and outputs a signal having the H level in a case in which the number of H level signals among the three input signals is one or three. Signals $Q_0$ to $Q_2$ of the data unit are input to the parity detecting unit 24a, signals $Q_3$ to $Q_5$ of the data unit are input to the parity detecting unit 24b, and signals $Q_6$, $Q_7$, and the parity bit PB are input to the parity detecting unit 24c. The outputs of the parity detecting units 24a to 24c are input to the parity detecting unit 24d and the parity detecting signal ODD is output.

In FIG. 8, the parity detecting signal ODD output from the parity detecting circuit 2481 is input to an inverting input terminal of an AND gate 2482, the stop bit SPB is input to an inverting input terminal of an AND gate 2483, and the writing control signal WR0 is input to the other input terminals of each of the AND gates 2482 and 2483. Whenever the writing control signal WR0 goes to the H level, the AND gates 2482 and 2483 go into conduction states. With this case, in the only case in which the parity detecting signal ODD is the L level, the output of the AND gate 2482 goes to the H level. In the only case in which the stop bit SPB is the L level, the output of the AND gate 2483 goes to the H level.

The output terminal of the AND gates 2482 is connected to the S input terminal of SR flip-flop 2484 and the clock signal CL is input to the R input terminal thereof. The output terminal of the AND gate 2483 is connected to the S input terminal of SR flip-flop 2485 and the clock signal CL is input to the R input terminal thereof. The output terminals of the SR flip-flop 2484 and 2485 are connected to the corresponding input terminals of an AND gate 2487. Accordingly, when the clock signal is the L level, a signal input to the S input terminals of the SR flip-flops 2484 and 2485 are output from the output terminals thereof. When the clock signal is the H level, both of the SR flip-flops 2484 and 2485 are reset. With the above-described circuit, the output of the AND gate 2487 goes to the H level only in a case in which both of the parity detection signal ODD and the stop bit SPB are the L level. The output of the AND gate 2487 is the H level, which means the above described conditions (1) and (2) are satisfied.

Since the signals $Q_0$ to $Q_7$ of the data unit are input to corresponding inverting input terminals of an AND gate 2486, only in a case in which all of the signals $Q_0$ to $Q_7$ are the L levels, the output terminal of the AND gate 2486 goes to the H level. That is, the output terminal of the AND gate 2486 is the H level, which means that the above-described condition (3) is satisfied.

The output terminals of the AND gates 2486 and 2487 are connected to the corresponding input terminals of an AND gate 2488. Accordingly, the signal output from the output terminal of the AND gate 2488, i.e., the control signal CNT, is the H level, which means that all of the above-described conditions (1) to (3) are satisfied. Hence, in a case in which the control signal CNT is the H level, the transmitted packet can be determined to be the charging packet; and in a case in which the control signal CNT is the L level, the transmitted packet is the other packet (i.e., the data packet). Using the control signal CNT, the format of the transmitted packet can be determined.

In FIG. 3, the output of the packet determining circuit 248 is connected to the charging control circuit 242 and an inverting input terminal of the AND gate 252. Hence, in the only case in which the control signal CNT is the H level, the AND gate 252 is in a non-conducting state. The writing control signal WR0 output from the timing control circuit 250 is input to the other input terminal of the AND gate 252. The output terminal of the AND gate 252 is connected to a writing signal input terminal WR of the memory (storage unit) 254. The parallel data output from the serial-to-parallel converting circuit 247 is input to the memory 254. The memory 254 fetches the parallel signal (the signals $Q_0$ to $Q_7$ and PB) and stores it therein as the data when the writing signal input terminal WR is the H level. That is, the AND gate 252 constitutes a storage control unit and the AND gate 252 and the charging control circuit 242 constitutes a part of a control unit.

The data written to the memory 254 is properly read by a control unit 230, and the control unit 230 performs control in accordance with the contents of the read data. The control unit 230 is provided with a timing function for causing the display unit 204 to display the time while controlling an instructed action in accordance with an operation of an input unit 103 from the user.

Next, in the station 100 and the electronic watch 200 according to one embodiment having the above-described construction, the charging operation and the data transfer operation are described.

Initially, as shown in FIG. 1, the user causes the electronic watch 200 to be contained in the recessed part 101 of the station 100. Because of this, since the station-side inductor 110 and the watch-side inductor 210 face each other, as shown in FIG. 2, the station 100 and the electronic watch 200 are electromagnetically coupled.

Afterwards, the user operates the input unit 103 of the station 100 so as to start the charging. The control unit 142 outputs, to the packet creating circuit 144, a control signal for creating the charging packet. When the packet creating circuit 144 receives this control signal, it creates the packet by setting the L level to all of the start bit STB, the 8-bit data unit, the parity bit PB, and the stop bit SPB, and outputs the signal representing this packet to the transmission circuit 146. When the transmission circuit 146 receives the created packet, the transmission circuit 146 outputs a switching signal obtained by causing a fixed frequency pulse signal to be output in bursts while the charging packet is output from the packet creating circuit 144.

The switching signal output from the transmission circuit 146 causes the transistor 148 to be switched, which changes the current flowing across the station-side inductor 110. Because of this, since the magnetic flux penetrating through the watch-side inductor 210 is varied, an induced current is generated in the watch-side inductor 210 (see Si in FIG. 5).

The current generated in the watch-side inductor 210 is input as the signal S1 to the demodulation circuit 244. When the signal S1 is input to the demodulation circuit 244, the demodulation signal $S_{in}$ is output. Since the transmitted packet is the charging packet, as shown in FIG. 10, the demodulation signal $S_{in}$ is obtained by setting the L level to all bits thereof. FIG. 10 shows a timing chart illustrating operations of the electronic device according to one embodiment of the present invention.

The demodulation signal $S_{in}$ output from the demodulation circuit 244 is input to the packet determining circuit 248 and the serial-to-parallel converting circuit 247. The demodulation signal $S_{in}$ input to the serial-to-parallel converting circuit 247 is converted into the parallel signal and each of the bits $Q_0$ to $Q_7$ of the signals of the parallel signal, PB, and SPB are output to the packet determining circuit 248 and the memory 254. Since the writing signal input terminal WR is retained at the L level at this point, the content of the data is not stored in the memory 254.

The packet determining circuit 248 causes the circuits shown in FIGS. 8 and 9 to perform logical operations on signals $Q_0$ to $Q_7$, PB, and SPB. Now, since signals $Q_0$ to $Q_7$, PB, and SPB all are the L level, the control signal CNT goes to the H level (see FIG. 10). When this control signal CNT is input to the charging control circuit 242, the cathode of the diode 240 and the positive-side terminal of the secondary battery 220 are caused to be connected. As a result of this, the current generated in the watch-side inductor 210 is rectified by the diode 240 and flows into the secondary battery 22 via the charging control circuit 242. In other words, the secondary battery 22 is charged.

On the other hand, since the control signal CNT is input to the inverting input terminal of the AND gate 252, the AND gate 252 goes into the non-conducting state. Hence, since the writing signal input terminal WR of the memory 254 is retained at the L level, writing to the memory 254 is not performed.

The above-described operations are repeated during the charging. In FIG. 10, a delay is caused for a time T between when the demodulation signal $S_{in}$ goes to the L level and when the control signal CNT goes to the H level. This means that it takes the serial-to-parallel converting circuit 247 and the packet determining circuit 248 at least an amount of time corresponding to one packet to determine whether the packet is the charging packet.

Next, operations are described in which a data packet is exchanged during the charging.

In the middle of the charging, the user is assumed to perform an input operation for data input or data transmission by operating the input unit 103 of the station 100. The control unit 142 outputs a control signal for creating the transmission data and the data packet to the packet creating circuit 144. When the packet creating circuit 144 receives the control signal for creating the transmission data and the data packet, the packet is created which contains the start bit STB having the L level, the data unit having the level of each bit so as to correspond to the transmission data, the parity bit PB in accordance with the content of the data unit, and the stop bit SPB having the H level, and then a signal representing this packet is output. When the transmission circuit 146 receives the created packet, the transmission circuit 146 outputs in turn a switching signal corresponding to the levels of the bits constituting the packet.

The switching signal output from the transmission circuit 146 causes the transistor 148 to be switched, which changes the current flowing through the station-side inductor 110. Because of this, since the magnetic flux penetrating through the watch-side inductor 210 varies, the induced current is generated in the watch-side inductor 210.

The current generated in the watch-side inductor 210 is input as the signal S1 to the demodulation circuit 244 (See FIG. 5). The demodulation signal $S_{in}$ is output from the demodulation circuit 244 having the signal S1 input to. Since the transmitted packet is the data packet, the waveform of the demodulation signal $S_{in}$ is varied in accordance with the communication data in the packet.

The output demodulation signal $S_{in}$ output from the demodulation circuit 244 is input to the timing control circuit 250 and the serial-to-parallel converting circuit 247. The demodulation signal $S_{in}$ input to the serial-to-parallel converting circuit 247 is converted into the parallel data and signals $Q_0$ to $Q_7$, PB, and SPB are output in parallel to the packet determining circuit 248 and the memory 254. At this point, the content of the data represented by the signal is not stored because the writing signal input terminal WR is retained at the L level.

The packet determining circuit 248 causes the circuits shown in FIGS. 8 and 9 to perform logical operations on signals $Q_0$ to $Q_7$ of the data unit of the packet, the parity bit PB, and the stop bit SPB. Since the data packet has a configuration so that the parity check is performed using odd parity, a state in which each bit $Q_0$ to $Q_7$ of the data unit is the L level and the parity bit is also the L level basically never occurs. Hence, the control signal CNT output from the packet determining circuit 248 is the L level (see FIG. 10). This control signal CNT is input to the charging control circuit 242, which causes the cathode of the diode 240 and the positive-terminal of the secondary battery 220 to be isolated therebetween. As a result of this, since the current generated in the watch-side inductor 210 flows only into the demodulation circuit 244, the secondary battery is not charged.

On the other hand, the control signal CNT is input to the inverting input terminal of the AND gate 252. Since the level of the control signal CNT is the L level, the AND gate 252 is caused to be in the conduction state. As shown in FIG. 6, whenever one packet is received, one shot of the writing control signal WR0 is output. Accordingly, at this point, the communication data represented by the signal output from the serial-to-parallel circuit 103 is written to the memory 254.

The above-described operations are repeated during the data transfer. That is, whenever the electronic watch 200 receives one communication packet, the writing control signal WR0 is output from the timing control circuit 250 (see FIG. 10), whereby writing the communication data to the memory 254 is performed.

As described above, the station 100 and the electronic watch 200 according to the present embodiment perform the charging and the data transfer using the packet. Therefore, for example, while the data transfer is being performed for a long time, the charging can be performed (by inserting the charging packet among a series of the data packet); on the contrary, while the charging transfer is being performed for a long time, the data transfer can be performed (by inserting the data packet among a series of the charging packet). Furthermore, since the actions can be switched when the user desires, the usability can be greatly improved.

In the present embodiment, during the charging, the station 100 transmits the charging packet, and the electronic watch 200 determines that the transmitted packet is the charging packet, thereby controlling each unit so that the charging of the secondary battery 220 is performed while preventing a writing operation to the memory 254. Because of this, a risk can be avoided in which inappropriate data is written to the memory 254 during the charging of the secondary battery 220. That is, malfunction of the electronic watch 200 can be prevented.

In the present embodiment, during the data transfer, the station 100 transmits the data packet and the electronic watch 200 determines that the transmitted data is the data packet thereby controlling each unit so that the charging of the secondary battery 220 is prohibited while permitting a writing operation to the memory 254. Because of this, the charging of the secondary battery 220 is not performed during the data communication. That is, the overcharging of the secondary battery 220 can be prevented.

In the above-described embodiment, the following modifications can be made.

For example, in the above-described embodiment, a description is made using an example in which the packet transfer from the station 100 to the electronic watch 200 is performed. Alternatively, along with provision of the circuit equivalent to the demodulation circuit 244 in the station 100, circuits equivalent to the packet creating circuit 144 and the transmission circuit 146 are provided in the electronic watch 200 so that the packet transmission can be performed from the electronic watch 200 to the station 100.

In the above-described embodiment, the charging or the data transfer is determined by an instruction from the user. However, as shown in FIG. 11, by detecting, in the electronic watch 200, the voltage across the secondary battery 220 shortly after the packet is received from the station 100, it may be determined in accordance with the detected value whether the communication is to be continued or the charging is to be performed. FIG. 11 is a diagram illustrating a modified embodiment of the present invention. In order to realize this form, a voltage detection circuit for detecting the voltage of the secondary battery 220 and a charging-request transmission circuit for transmitting a charging request (electrical power transfer request) to the station 100 must be provided in the electronic watch 200 while a reception circuit receiving the charging-request must be provided in the station 100. Alternatively, in this form, an operation unit is provided in the electronic watch 200 side and the user operates this operation unit so that a charging start instruction of the secondary battery 220 or a data transfer start instruction can be input.

Alternatively, a sensor or the like is provided in the electronic watch 200 so that vital information, such as the pulse rate or the heart rate can be detected, stored, and displayed. Furthermore, in the station 100, data that the user input by operating the input unit 103 may be stored as a communication data in the data unit of the data packet.

The present invention is applicable to every electronic device that performs electrical power transfer or data transfer. For example, the present invention is applicable to an electrical device provided with a secondary battery, such as an electric toothbrush, an electric shaver, a cordless telephone, a portable telephone, a personal handy phone system terminal, a mobile personal computer, or a PDA (Personal Digital Assistants), as well as its charger.

Furthermore, in the above-described embodiment, the case is described in which the station-side inductor 110 and the watch-side inductor 210 are provided and then the electrical power transfer and the signal transfer are performed by means of electromagnetic coupling or electromagnetic induction. However, transfer energy is not limited to electromagnetic energy. For example, a form using optical energy or acoustic energy may be applicable.

In a case in which optical energy is used, the form can be implemented by, for example, combining an LED (Light Emitting Diode) and a photodiode. In a case in which acoustic energy is used, the form can be implemented by, for example, combining a sound-emitting element, such as a speaker, and a microphone, whereby a transfer environment equivalent to the one in which electric energy is used can be realized.

What is claimed is:

1. An electronic device in which electrical power transfer and data transfer are performed by exchanging physical energy with an opposing device, said electronic device comprising:

a packet creating unit for creating a packet having a format corresponding to the electrical transfer or the data transfer, a superposing unit for superposing the created packet created by said packet creating unit onto said physical energy, and an instructing unit for selectively instructing either said electrical power transfer or the data transfer, wherein said packet creating unit creates the packet having the format corresponding to the transfer instructed by said instructing unit.

2. An electronic device according to claim 1, wherein, in a case in which an electrical power transfer request is transmitted from said opposing device, said instructing unit gives an electrical power transfer instruction.

3. An electronic device in which electrical power transfer and data transfer are performed by exchanging physical energy with an opposing device, said electronic device comprising:

a packet creating unit for creating a packet having a format corresponding to the electrical transfer or the data transfer, and a superposing unit for superposing the created packet created by said packet creating unit onto said physical energy, wherein said packet creating unit creates a data transfer format packet by storing an appropriate error detection code in a region for storing an error detection code provided in the packet when the data transfer format packet is created, and creates an electrical power transfer format packet by storing an inappropriate error detection code therein when the electrical power transfer format data is created.

4. An electronic device in which electrical power transfer and data transfer are performed by exchanging physical energy with an opposing device, said electronic device comprising:

an extracting unit for extracting a packet superposed on said physical energy generated from said opposing device, a packet determining unit for determining a packet format extracted by said extracting unit, and a control unit for performing either electrical power reception or data reception based on the determination result by said packet determining unit;

a converting unit for converting said physical energy generated from said opposing device into electrical energy, and a secondary battery, and in a case in which said packet format determined by said packet determining unit is an electrical power transfer format, said control unit comprises a charging control unit for charging said secondary battery using said electrical energy.

5. An electronic device according to claim 4, further comprising:

a voltage detecting unit for detecting the voltage of said secondary battery when said packet is received, and a charging-request transmission unit for, in a case in which the voltage of said secondary battery is a predetermined value or less, transmitting a request for charging to the first device.

6. An electronic device in which electrical power transfer and data transfer are performed by exchanging physical energy with an opposing device, said electronic device comprising:

an extracting unit for extracting a packet superposed on said physical energy generated from said opposing device, a packet determining unit for determining a packet format extracted by said extracting unit, and a control unit for performing either electrical power reception or data reception based on the determination result by said packet determining unit;

wherein said packet determining unit error-detects the packet extracted by said extracting unit and determines said packet format based on the result of the error detection.

7. An electronic device in which a first device and a second device are provided, and electrical power transfer and data transfer are performed by exchanging physical energy between said first device and said second device, said electronic device being further configured such that:

said first device is provided with a packet creating unit for creating a packet having a format corresponding to electrical power transfer or data transfer and a superposing unit for superposing said packet created by said packet creating unit onto said physical energy, said second device is provided with an extracting unit for extracting said packet superposed on said physical energy, a packet determining unit for determining a packet format extracted by said extracting unit, and a control unit for performing either electrical power reception or data reception based on the determination result by said packet determining unit, said first device is provided with an instructing unit for selectively instructing either said electrical power transfer or said data transfer, and said packet creating unit creates the packet having the format corresponding to the transfer instructed by said instructing unit.

8. An electronic device in which a first device and a second device are provided, and electrical power transfer and data transfer are performed by exchanging physical energy between said first device and said second device, said electronic device being further configured such that:

said first device is provided with a packet creating unit for creating a packet having a format corresponding to electrical power transfer or data transfer and a superposing unit for superposing said packet created by said packet creating unit onto said physical energy, said second device is provided with an extracting unit for extracting said packet superposed on said physical energy, a packet determining unit for determining a packet format extracted by said extracting unit, and a control unit for performing either electrical power reception or data reception based on the determination result by said packet determining unit, said second device is provided with a converting unit for converting said physical energy into electrical energy and a secondary battery, and said control unit comprises a charging control unit for charging said secondary battery using said electrical energy in a case in which said packet format determined by said packet determining unit is an electrical power transfer format.

9. An electronic device according to claim 8, wherein:

said second device is provided with a voltage detecting unit for detecting the voltage of said secondary battery when said packet is received and a charging-request transmission unit for transmitting a request for charging to said first device in a case in which the voltage of said secondary battery is at a predetermined value or lower, and said instructing unit of said first device gives an instruction so that the charging packet is created in a case in which said charging-request is transmitted.

10. An electronic device in which a first device and a second device are provided, and electrical power transfer and data transfer are performed by exchanging physical energy between said first device and said second device, said electronic device being further configured such that:

said first device is provided with a packet creating unit for creating a packet having a format corresponding to electrical power transfer or data transfer and a superposing unit for superposing said packet created by said packet creating unit onto said physical energy, said second device is provided with an extracting unit for extracting said packet superposed on said physical energy, a packet determining unit for determining a packet format extracted by said extracting unit, and a control unit for performing either electrical power reception or data reception based on the determination result by said packet determining unit, said packet creating unit creates a data transfer format packet by storing an appropriate error detection code in a region for storing an error detection code provided in the packet when the data transfer format packet is created, and creates an electrical power transfer format packet by storing an inappropriate error detection code therein when the electrical power transfer format data is created, and said packet determining unit error-detects the packet extracted by said extracting unit and determines said packet format based on the result of the error detection.

11. An electronic device in which electrical power transfer and data transfer are performed by exchanging physical energy with an opposing device, said electronic device comprising:

a packet creating unit configured to create a charging packet corresponding to a packet of electrical power to be transferred and to create a data packet corresponding to packet of data to be transferred, a superposing unit configured to superpose the packet created by the packet creating unit onto the physical energy for transfer, and an input unit configured to control the packet creating unit and the superposing unit to create and transfer charging and data packets in any desired sequence based on user input.

12. An electronic device in which electrical power transfer and data transfer are performed by exchanging physical energy with an opposing device, said electronic device comprising:

an extracting unit configured to extract a packet superposed on the physical energy received from the opposing device, a packet determining unit configured to determine whether the packet extracted by the extracting unit is a charging packet or a data packet, and a control unit configured to perform electrical power reception and data reception, whereby the control unit is adapted to switch between electrical power reception and data reception in response to the result of the packet determining unit which can receive and process charging and data packets in any sequence.

13. An electronic device according to claim 12, further comprising:

a storing unit configured to store data, and a storage control unit configured to allow received data to be stored in the storing unit, in a case in which the received packet is determined by the packet determining unit to be a data packet.

14. An electronic device in which a first device and a second device are provided, and electrical power transfer and data transfer are performed by exchanging physical energy between the first and second devices, said electronic device being further configured such that:

the first device includes a packet creating unit configured to create a charging packet corresponding to a packet of electrical power to be transferred and to create a data packet corresponding to packet of data to be transferred, and a superposing unit configured to superpose the packet created by the packet creating unit onto the physical energy for transfer, and an input unit configured to control the packet creating unit and the superposing unit to create and transfer charging and data packets in any desired sequence based on user input; and the second device includes an extracting unit configured to extract a packet superposed on the physical energy received from the opposing device, a packet determining unit configured to determine whether the packet extracted by the extracting unit is a charging packet or a data packet, and a control unit configured to perform electrical power reception and data reception, whereby the control unit is adapted to switch between electrical power reception and data reception in response to the result of the packet determining unit which can receive and process charging and data packets in any sequence.

15. An electronic device according to claim 14, wherein the second device includes a storing unit, and a storage control unit configured to allow received data to be stored in the storing unit, in a case in which the received packet is determined by the packet determining unit to be a data packet.

* * * * *